(12) United States Patent
Tanaka

(10) Patent No.: US 6,385,034 B2
(45) Date of Patent: May 7, 2002

(54) SEMICONDUCTOR ELECTRONIC PART (75) Inventor: Ryuichi Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/726,512

(22) Filed: Dec. 1, 2000

(30) Foreign Application Priority Data

Dec. 3, 1999 (JP) .......................................... 11-345493

(51) Int. Cl.[7] .............................................. H01G 4/228
(52) U.S. Cl. ................. 361/306.3; 361/309; 361/321.2; 361/306.1
(58) Field of Search ............................... 361/301.4, 303, 361/306.1–306.3, 309, 310, 311–313, 321.2, 329; 338/20, 21, 182–185

(56) References Cited

U.S. PATENT DOCUMENTS

| | | | | |
|---|---|---|---|---|
| 3,740,624 A | * | 6/1973 | McAdams, Jr. et al. | 361/321.3 |
| 4,731,697 A | * | 3/1988 | McLarney | 361/321.2 |
| 5,872,695 A | * | 2/1999 | Fasano et al. | 361/301.4 |
| 5,880,925 A | * | 3/1999 | DuPre et al. | 361/303 |
| 6,091,598 A | * | 7/2000 | Kobayashi | 361/303 |
| 6,153,069 A | * | 11/2000 | Pottgen et al. | 204/403 |

FOREIGN PATENT DOCUMENTS

| | | | |
|---|---|---|---|
| JP | 1-312817 | * | 12/1989 |
| JP | 11-8160 | * | 12/1999 |

* cited by examiner

*Primary Examiner*—Anthony Dinkins
(74) *Attorney, Agent, or Firm*—Oblon, Spivak, McClelland, Maier & Neustadt, P.C.

(57) ABSTRACT

A semiconductor electronic part includes a semiconductor ceramic substrate and at least one internal electrode. The internal electrode is disposed inside the semiconductor ceramic substrate and includes an end led out to an end edge of the semiconductor ceramic substrate and at least one cutout region. It is preferable that the internal electrode has a plurality of the cutout regions. Further preferably, the plurality of the cutout regions are arranged to be distanced from one another in a direction of width of the semiconductor ceramic substrate.

16 Claims, 14 Drawing Sheets

SEMICONDUCTOR ELECTRONIC PART

BACKGROUND OF THE INVENTION

1. Field of the Invention

The present invention relates to a semiconductor electronic part. Examples of the semiconductor electronic part according to the present invention include varistor, PTC thermistor, NTC thermistor, semiconductor capacitor, etc.

2. Description of the Related Art

Various kinds of semiconductor electronic parts are known heretofore. Among these parts, there are known semiconductor electronic parts each having an internal electrode buried in a semiconductor ceramic substrate.

The semiconductor electronic part of this type obtains semiconductor characteristic by utilizing contact between the internal electrode and the semiconductor ceramic substrate. The semiconductor ceramic substrate is selected in accordance with the kind of the semiconductor electronic part to be obtained. A material for constituting the internal electrode is selected so that predetermined semiconductor characteristic is obtained between the semiconductor ceramic substrate and the internal electrode.

As described above, in the semiconductor electronic part of this type, the composition of the internal electrode is required to be selected so that predetermined semiconductor characteristic can be obtained in accordance with the semiconductor ceramic substrate. In the case of a capacitor, or the like, strength of adhesion can be improved by adding a third component such as glass frit or the like to the constituent material for the electrode. However, if such a means is applied to the semiconductor electronic part, the semiconductor characteristic deteriorates. Hence, the semiconductor electronic part basically has a problem that it is difficult to improve strength of adhesion of the internal electrode to the semiconductor ceramic substrate.

For example, in the case of a varistor, a titanium oxide type substrate, a strontium titanate type substrate or a zinc oxide type substrate is generally used as the semiconductor ceramic substrate. Such a semiconductor ceramic substrate per se has voltage nonlinearity. In order to extract the voltage nonlinearity of the semiconductor ceramic substrate, the internal electrode must be selected from materials which come into ohmic contact with the semiconductor ceramic substrate. Specifically, the internal electrode must contain silver as a main component and at least one member selected from the group consisting of In, Ga, Sn, Sb, Cd, Zn and Al as an additive component. If glass frit, or the like, is added to improve strength of adhesion, ohmic contact characteristic deteriorates and, accordingly, voltage nonlinearity deteriorates.

As described above, in such a semiconductor electronic part, strength of adhesion between the internal electrode and the semiconductor ceramic substrate was generally insufficient, so that various troubles occurred in production steps. Actually, in the steps of producing the semiconductor electronic part, there are several steps for acting physical stress such as thermal contact bonding, cutting, separation, etc., on the semiconductor ceramic substrate. Hence, there was a risk that the physical stress might cause troubles such as electrode peeling etc. at an end edge of the semiconductor ceramic substrate. As a result, failure in characteristic occurred frequently. This caused lowering of the yield of products.

An electrode shaped like an I-type pattern or a T-type pattern is generally known as the internal electrode in the semiconductor electronic part.

If the internal electrode is shaped like the I-type pattern, the aforementioned problem appears more remarkably. Specifically, if the internal electrode is shaped like the I-type pattern, the internal electrode has a small portion exposed at the end edge of the semiconductor ceramic substrate. Hence, when a terminal electrode was applied onto the semiconductor ceramic substrate and baked, strength of adhesion between the internal electrode and the terminal electrode was so weak that failure in characteristic occurred in the peeling test (easy adhesive strength test).

If the internal electrode is shaped like the T-type pattern, the internal electrode has a large portion exposed at the end edge of the semiconductor ceramic substrate in comparison with the I-type internal electrode. Hence, strength of adhesion between the T-type internal electrode and the terminal electrode is larger than that between the I-type internal electrode and the terminal electrode so that the occurrence of electrode peeling decreases. In this case, however, chopping or cracking was easily caused by physical stress because the internal electrode is exposed up to a corner of the semiconductor ceramic substrate. As a result, failure in characteristic occurred frequently. This caused lowering of the yield of products.

SUMMARY OF THE INVENTION

An object of the present invention is to provide a semiconductor electronic part in which strength of adhesion of an internal electrode to a semiconductor ceramic substrate is so large that troubles such as electrode peeling, chipping, cracking, etc. can be prevented securely.

Another object of the present invention is to provide a semiconductor electronic part which is high in reliability because failure in characteristic little occurs.

To solve the aforementioned problem, the semiconductor electronic part according to the present invention comprises a semiconductor ceramic substrate, and at least one internal electrode.

The internal electrode is provided inside the semiconductor ceramic substrate. The internal electrode has one end side led out to an end edge of the semiconductor ceramic substrate, and at least one cutout region. The cutout region is provided inside the internal electrode.

As described above, the internal electrode is protected by the semiconductor ceramic substrate because it is provided inside the semiconductor ceramic substrate. Hence, a semiconductor electronic part excellent in corrosion resistance, oxidation resistance, impact resistance, etc. is obtained.

The internal electrode has one end side led out to an end edge of the semiconductor ceramic substrate. According to this structure, the semiconductor electronic part can be used as a chip-like electronic part by adding terminal electrodes to end edges of the semiconductor ceramic substrate.

The internal electrode has at least one cutout region at its one end side. According to this structure, the cutout region of the internal electrode is filled with the semiconductor ceramic substrate as if the internal electrode is stitched by the semiconductor ceramic substrate filled in the cutout region. Accordingly, strength of adhesion between the internal electrode and the semiconductor ceramic substrate increases. Hence, troubles such as electrode peeling, chipping, cracking, etc. can be prevented securely. As a result, a semiconductor electronic part which is so high in reliability that the occurrence of failure in characteristic can be reduced is obtained.

Preferably, a plurality of cutout regions are provided. In this case, strength of adhesion between the internal electrode and the semiconductor ceramic substrate can be increased more greatly compared with the case where one cutout region is provided. Hence, troubles such as electrode peeling etc. can be prevented securely. As a result, the reliability of the semiconductor electronic part is improved more greatly, so that the occurrence of failure in characteristic is reduced more greatly.

Preferably, the cutout regions are provided to be distanced from one another in a direction of the width of the semiconductor ceramic substrate. In this case, strength of adhesion between the internal electrode and the semiconductor ceramic substrate can be increased more greatly compared with the case where one cutout region is provided at one side of the internal electrode in the direction of the width thereof. Hence, troubles such as electrode peeling etc. can be prevented securely. As a result, the reliability of the semiconductor electronic part is improved more greatly, so that the occurrence of failure in characteristic is reduced more greatly.

Other objects, configurations and advantages of the present invention will be described more in detail with reference to the accompanying drawings.

DETAILED DESCRIPTION OF THE PREFERRED EMBODIMENTS

Semiconductor Electronic Part

Figure 1:
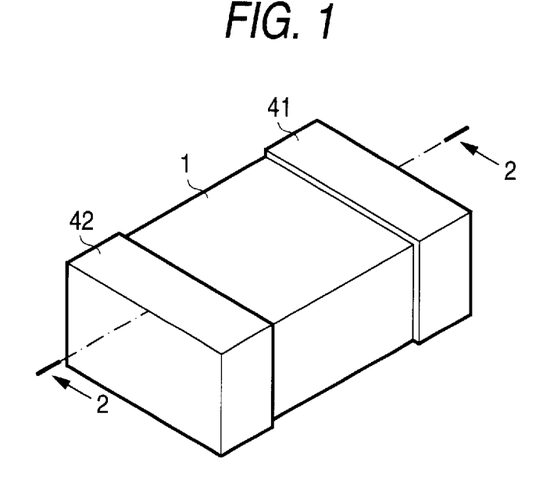
FIG. 1 is a perspective view showing a semiconductor electronic part according to the present invention.
Figure 2:
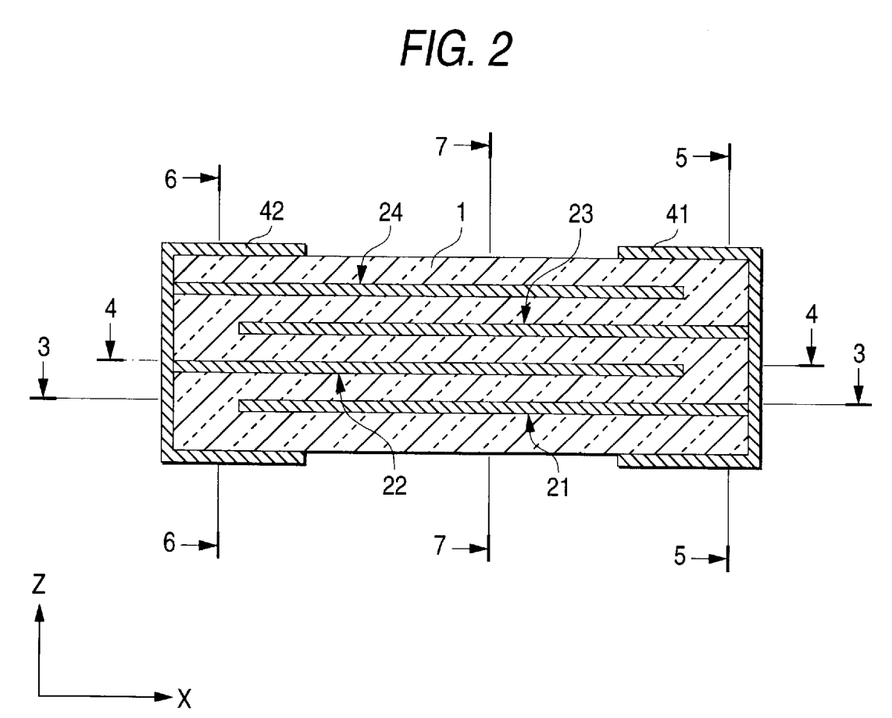
FIG. 2 is an enlarged sectional view taken along the line 2—2 in FIG. 1.
Figure 3:
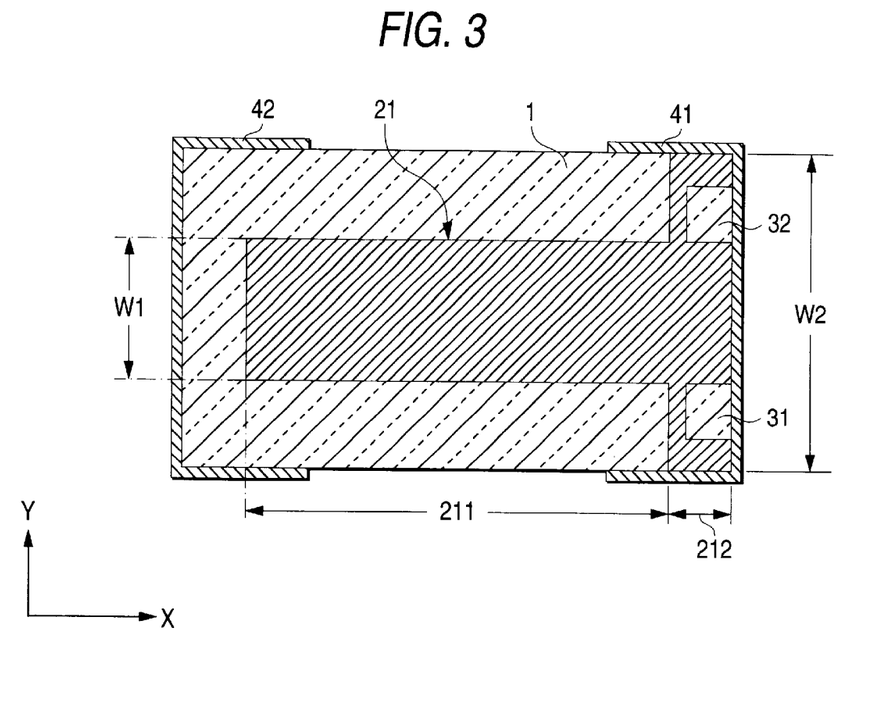
FIG. 3 is a sectional view taken along the line 3—3 in FIG. 2.
Figure 4:
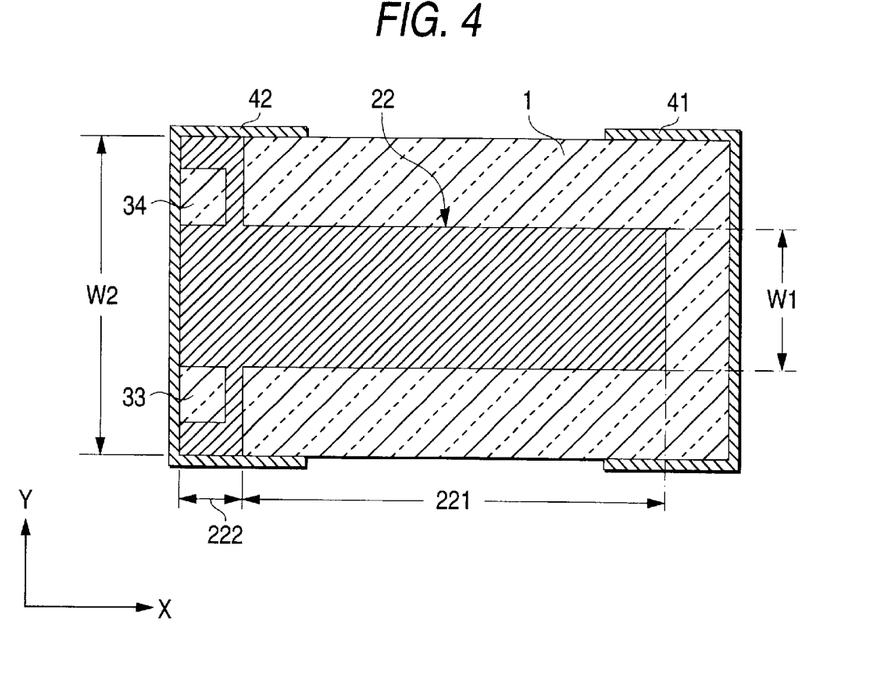
FIG. 4 is a sectional view taken along the line 4—4 in FIG. 2.
Figure 5:
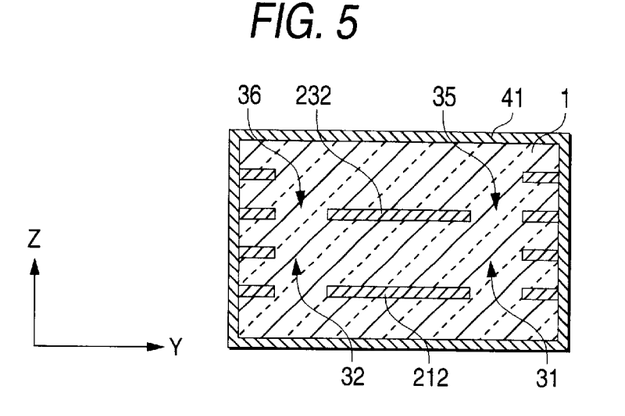
FIG. 5 is a sectional view taken along the line 5—5 in FIG. 2.

FIG. 1 is a perspective view showing a semiconductor electronic part according to the present invention. FIG. 2 is an enlarged sectional view taken along the line 2—2 in FIG. 1. FIG. 3 is a sectional view taken along the line 3—3 in FIG. 2. FIG. 4 is a sectional view taken along the line 4—4 in FIG. 2. FIG. 5 is a sectional view taken along the line 5—5 in FIG. 2. An embodiment shown in FIGS. 1 to 5 shows a varistor. The present invention is not limited thereto but maybe applied also to semiconductor electronic parts such as PTC thermistor, NTC thermistor, semiconductor capacitor, etc.

The semiconductor electronic part shown in the drawings comprises a semiconductor ceramic substrate 1, and internal electrodes 21 to 24. For example, the semiconductor ceramic substrate 1 is shaped like a rectangle about 1.0 mm long, about 0.5 mm wide and about 0.5 mm thick.

The semiconductor ceramic substrate 1 is selected in accordance with the kind of the semiconductor electronic part to be obtained. Because a varistor is shown in this embodiment, it will go well if the semiconductor ceramic substrate 1 is made of voltage-nonlinearity semiconductor ceramics as described above.

The internal electrodes 21 to 24 are provided inside the semiconductor ceramic substrate 1 so as to be distanced from one another in a thicknesswise direction Z. Each of the internal electrodes 21 and 23 has one end led out to one end edge of the semiconductor ceramic substrate 1 in the lengthwise direction X. Each of the internal electrodes 22 and 24 has the other end led out to the other end edge of the semiconductor ceramic substrate 1 in the lengthwise direction X.

The internal electrode 21 has cutout regions 31 and 32. The internal electrode 22 has cutout regions 33 and 34. The internal electrode 23 has cutout regions 35 and 36. The internal electrode 24 has cutout regions 37 and 38. In this embodiment, as shown in FIGS. 3 and 4, each of the cutout regions 31 to 38 is shaped like a rectangle.

The cutout regions 31 and 32 are provided at one end edge of the internal electrode 21 in the lengthwise direction X so as to be separated by a distance from each other in a widthwise direction Y. The cutout regions 33 and 34 are provided at the other end edge of the internal electrode 22 in the lengthwise direction X so as to be separated by a distance from each other in the widthwise direction Y. The cutout regions 35 and 36 are provided at one end edge of the internal electrode 23 in the lengthwise direction X so as to be separated by a distance from each other in the widthwise direction Y. The cutout regions 37 and 38 are provided at the other end edge of the internal electrode 24 in the lengthwise direction X so as to be separated by a distance from each other in the widthwise direction Y.

In this embodiment, the internal electrodes 21 to 24 are of the so-called T-type. The internal electrodes 21 and 22 will be described below by way of example.

Figure 7:
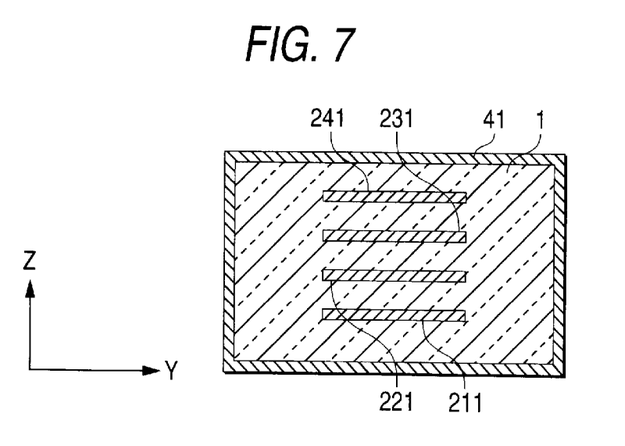
FIG. 7 is a sectional view taken along the line 7—7 in FIG. 2.

As shown in FIGS. 3, 5 and 7, the internal electrode 21 has a main electrode portion 211, and a pick-up electrode portion 212. As shown in FIG. 3, the pick-up electrode portion 212 is provided on one end side of the main electrode portion 211 in the lengthwise direction X. The pick-up electrode portion 212 has a width W2 approximately equal to the width of the semiconductor ceramic substrate 1. The main electrode portion 211 has a width W1 smaller than the width W2 of the pick-up electrode portion 212.

Figure 6:
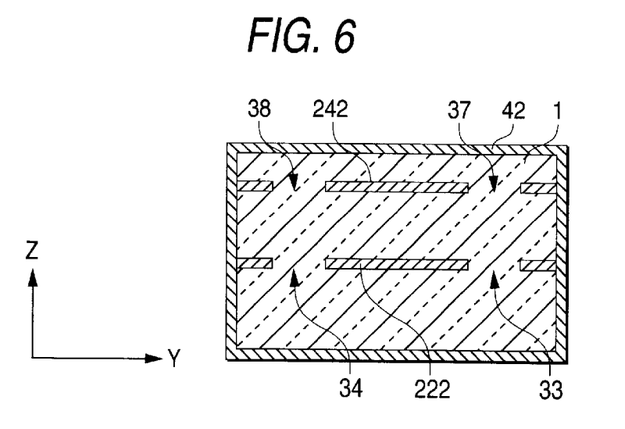
FIG. 6 is a sectional view taken along the line 6—6 in FIG. 2.

As shown in FIGS. 4, 6 and 7, the internal electrode 22 has a main electrode portion 221, and a pick-up electrode portion 222. As shown in FIG. 4, the pick-up electrode portion 222 is provided on the other end side of the main electrode portion 221 in the lengthwise direction X. The pick-up electrode portion 222 has a width W2 approximately equal to the width of the semiconductor ceramic substrate 1. The main electrode portion 221 has a width W1 smaller than the width W2 of the pick-up electrode portion 222.

Because a varistor is shown in this embodiment, it will go well if each of the internal electrodes 21 to 24 is made of a material that comes into ohmic contact with the aforementioned semiconductor ceramic substrate. Although this embodiment has shown the case where four internal electrodes 21 to 24 are provided, the number of internal electrodes can be changed at option. Though not shown, each of the internal electrodes 21 to 24 may be shaped like any figure other than the T-type such as an I-type.

The semiconductor electronic part shown in this embodiment further comprises terminal electrodes 41 and 42. The terminal electrode 41 is provided at one end of the semiconductor ceramic substrate 1 in the lengthwise direction X and connected to end portions of the internal electrodes 21 and 23. The terminal electrode 42 is provided at the other end of the semiconductor ceramic substrate 1 in the lengthwise direction X and connected to end portions of the internal electrodes 22 and 24.

As described above, because the internal electrodes 21 to 24 are disposed inside the semiconductor ceramic substrate 1, the internal electrodes 21 to 24 are protected by the semiconductor ceramic substrate 1. Hence, a semiconductor electronic part excellent in corrosion resistance, oxidation resistance, impact resistance, etc. is obtained.

Each of the internal electrodes 21 and 23 has one end led out to one end edge of the semiconductor ceramic substrate 1 in the lengthwise direction X. Each of the internal electrodes 22 and 24 has the other end led out to the other end edge of the semiconductor ceramic substrate 1 in the lengthwise direction X. According to this structure, the semiconductor electronic part can be used as a chip-like electronic part by provision of the terminal electrodes 41 and 42 in end edges of the semiconductor ceramic substrate 1.

The one-end sides of the internal electrodes 21 to 24 have cutout regions (31, 32) to (37, 38) respectively. According to this structure, the cutout regions (31, 32) to (37, 38) of the internal electrodes 21 to 24 are filled with the semiconductor ceramic substrate 1 as if the internal electrodes 21 to 24 are stitched by the semiconductor ceramic substrate 1 filled in the cutout regions (31, 32) to (37, 38) . Hence, strength of adhesion between the internal electrodes 21 to 24 and the semiconductor ceramic substrate 1 increases. Hence, troubles such as electrode peeling, chipping, cracking, etc., can be securely prevented. As a result, it is possible to obtain a semiconductor electronic part which is so high in reliability that any failure in characteristic does not occur.

In this embodiment, the internal electrodes 21 to 24 have the cutout regions (31, 32) to (37, 38) respectively. In this case, because strength of adhesion between the internal electrodes 21 to 24 and the semiconductor ceramic substrate 1 can be increased more greatly in comparison with the case where one cutout region is provided, troubles such as electrode peeling, etc., can be prevented more securely. As a result, the reliability of the semiconductor electronic part is improved more greatly.

Further, in this embodiment, the cutout regions 31 and 32 are provided at one end edge of the internal electrode 21 in the lengthwise direction X so as to be separated by a distance from each other in the widthwise direction Y. The cutout regions 33 and 34 are provided at the other end edge of the internal electrode 22 in the lengthwise direction X so as to be separated by a distance from each other in the widthwise direction Y. The cutout regions 35 and 36 are provided at one end edge of the internal electrode 23 in the lengthwise direction X so as to be separated by a distance from each other in the widthwise direction Y. The cutout regions 37 and 38 are provided at one end edge of the internal electrode 24 in the lengthwise direction X so as to be separated by a distance from each other in the widthwise direction Y. In this case, because strength of adhesion between the internal electrodes 21 to 24 and the semiconductor ceramic substrate 1 can be increased more greatly compared with the case where one cutout region is provided at one side of the internal electrodes 21 to 24 in the widthwise direction, troubles such as electrode peeling, etc., can be prevented more securely. As a result, the reliability of the semiconductor electronic part is improved more greatly.

Further, in this embodiment, each of the internal electrodes 21 to 24 is shaped like the so-called T-type pattern. In this case, troubles such as electrode peeling, etc., can be prevented securely. Moreover, because of the positions where the cutout regions are provided, troubles such as chipping, cracking, etc. caused by physical stress can be prevented from occurring.

The effect of the embodiment shown in FIGS. 1 to 7 will be described below more specifically with reference to actually measured data.

Sample number #1 shows a conventional product having I-type internal electrodes. Sample number #2 shows a conventional product having T-type internal electrodes.

Sample number #3 shows a semiconductor electronic part according to the present invention having the structure shown in FIGS. 1 to 7. Table 1 shows the rate of occurrence of defects (chipping, cracking) in external appearance and the rate of occurrence of electrode peeling with respect to the semiconductor electronic parts shown as sample numbers #1 to #3. In the electrode peeling test, electrode peeling between the internal electrodes and the terminal electrodes is detected in the condition that adhesive double coated tapes are first stuck onto surfaces of the terminal electrodes and then peeled therefrom.

TABLE 1

| Sample Number | Defect in External Appearance | | Electrode Peeling Test |
|---|---|---|---|
| | Chipping (the number of defectives/ the number of samples) | Cracking (the number of defectives/ the number of samples) | Peeling Rate (the number of defectives/ the number of samples) |
| #1 (Comparative Example 1) | 9/1000 | 2/10000 | 3/1000 |
| #2 (Comparative Example 2) | 43/1000 | 7/10000 | 0/1000 |
| #3 (Example) | 0/1000 | 0/10000 | 0/1000 |

As shown in Table 1, electrode peeling is observed in 3 in 1000 samples in the semiconductor electronic part shown as sample number #1 whereas all 1000 samples are good products in the semiconductor electronic part shown as sample number #3.

Further, chipping is observed in 43 in 1000 samples in the semiconductor electronic part shown as sample number #2 whereas all 1000 samples are good products in the semiconductor electronic part shown as sample number #3. Further, cracking is observed in 7 in 10000 samples in the semiconductor electronic part shown as sample number #2 whereas all 10000 samples are good products in the semiconductor electronic part shown as sample number #3. It is apparent from these results that the semiconductor electronic part according to the present invention can prevent troubles such as electrode peeling, chipping, cracking, etc. securely.

Figure 8:
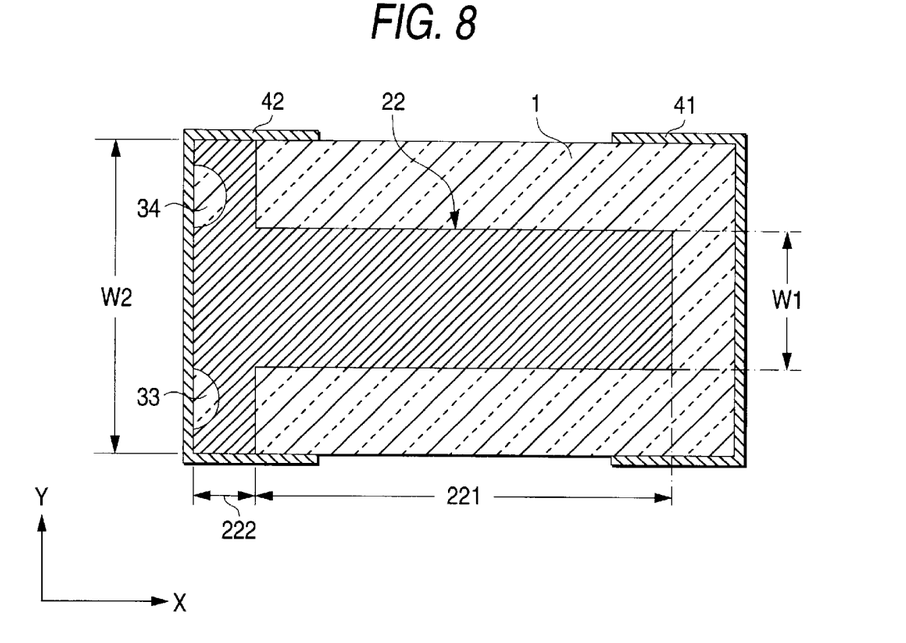
FIG. 8 is a sectional view showing another embodiment of the semiconductor electronic part according to the present invention.
Figure 9:
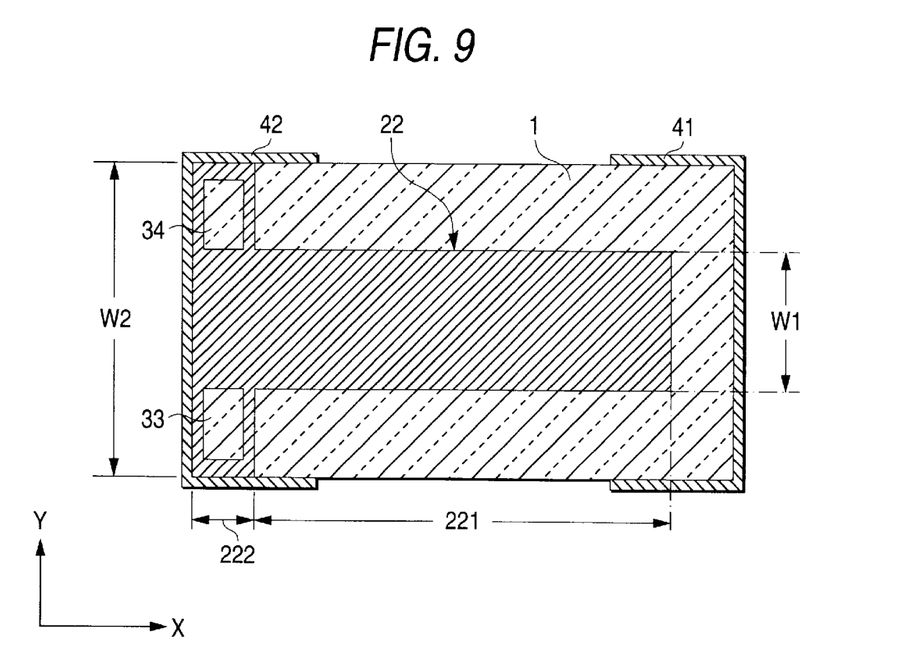
FIG. 9 is a sectional view showing another embodiment of the semiconductor electronic part according to the present invention.

FIGS. 8 and 9 are sectional views showing other embodiments of the semiconductor electronic part according to the present invention. In the drawings, constituent parts the same as those shown in FIGS. 1 to 7 are referenced correspondingly. Although the drawings show the internal electrode 22, they can be applied to the other electrodes 21, 23 and 24.

The embodiment shown in FIG. 8 is characterized in that each of the cutout regions 31 to 38 is shaped like a half circle. The embodiment shown in FIG. 9 is characterized in that the cutout regions 31 to 38 are provided on the inside of an end edge of pick-up electrode portions 212 to 242. Each of the embodiments fulfills the same operation and effect as those in the embodiment shown in FIGS. 1 to 7.

Method of Producing Semiconductor Electronic Part

A sheet lamination method, a printing method, or the like, is known as a method of producing the semiconductor electronic part according to the present invention. The producing method will be described below with reference to the drawings, taking the semiconductor electronic part shown in FIGS. 1 to 7 as an example.

Figure 10:
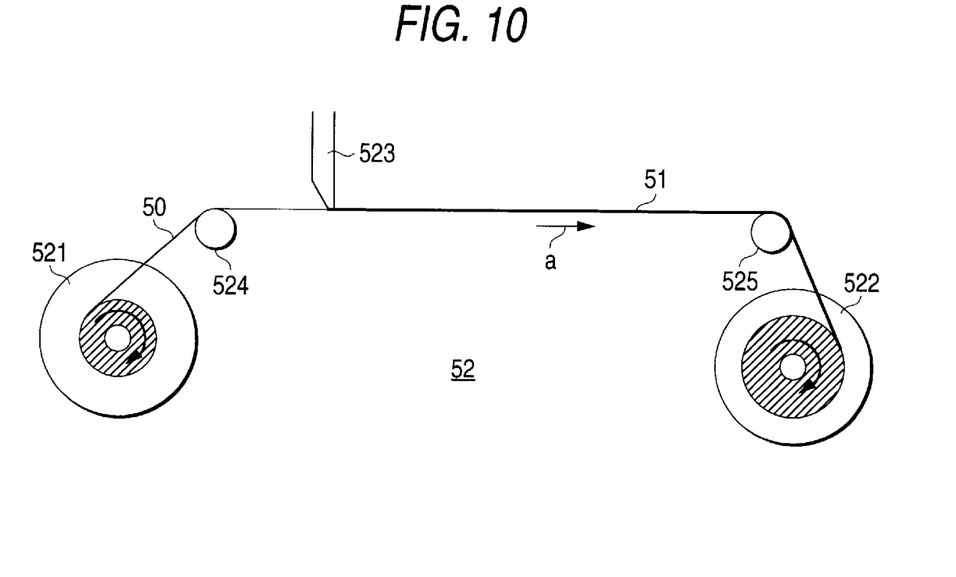
FIG. 10 is a schematic view for explaining a step for producing the semiconductor electronic part according to the present invention.
Figure 11:
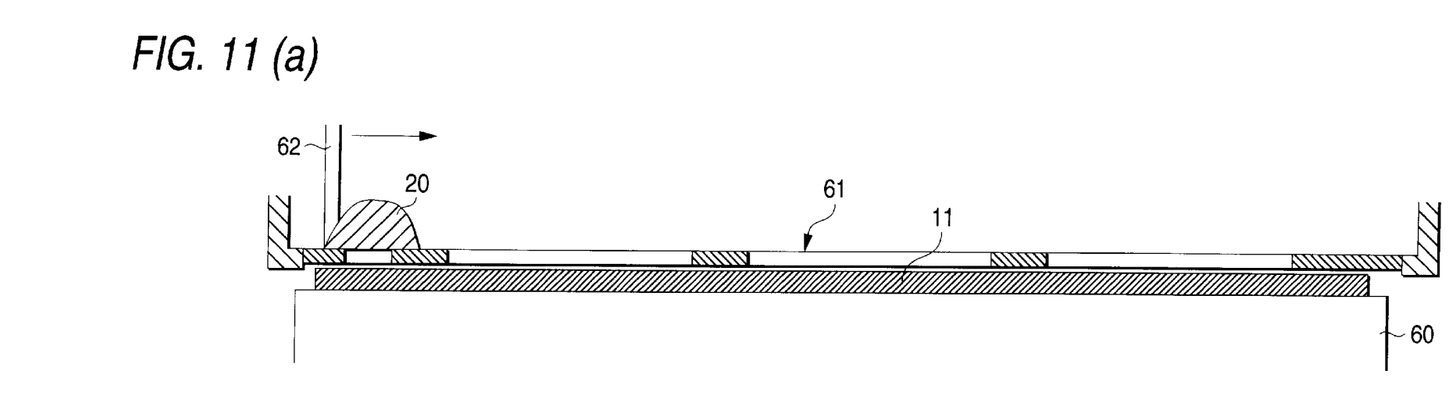
FIGS. 11(a) and 11(b) are schematic views for explaining production steps next to FIG. 10.

FIGS. 10 to 17 are schematic views for explaining the sheet lamination method. First, as shown in FIG. 10, a semiconductor ceramic paste 51, which is prepared by weighing and mixing semiconductor ceramic powder, an organic binder and a solvent in a predetermined proportion, is applied onto a flexible support film 50 by a method such as a doctor blade method, an extrusion method, or the like. Thus, a ceramic film is obtained. The doctor blade method will be described below.

As shown in FIG. 10, a coating apparatus 52 includes a feed roller 521, a take-up roller 522, a doctor blade 523, and auxiliary rollers 524 and 525. The feed roller 521 and the take-up roller 522 are arranged so as to be separated by a distance from each other. The feed roller 521 is wound with one end side of the flexible support film 50, while the take-up roller 522 is wound with the other end side of the flexible support film 50. The doctorblade 523 applies the semiconductor ceramic paste 51 onto one surface side of the flexible support film 50 which is running in one direction a. The auxiliary rollers 524 and 525 are arranged so as to come into contact with the opposite surface of the flexible support film 50 to the surface of the flexible support film 50 onto which the semiconductor ceramic paste 51 is applied. In this manner, a required number of semiconductor ceramic sheets each having a thickness of from about 0.05 mm to about 0.5 mm are produced.

Figure 12:
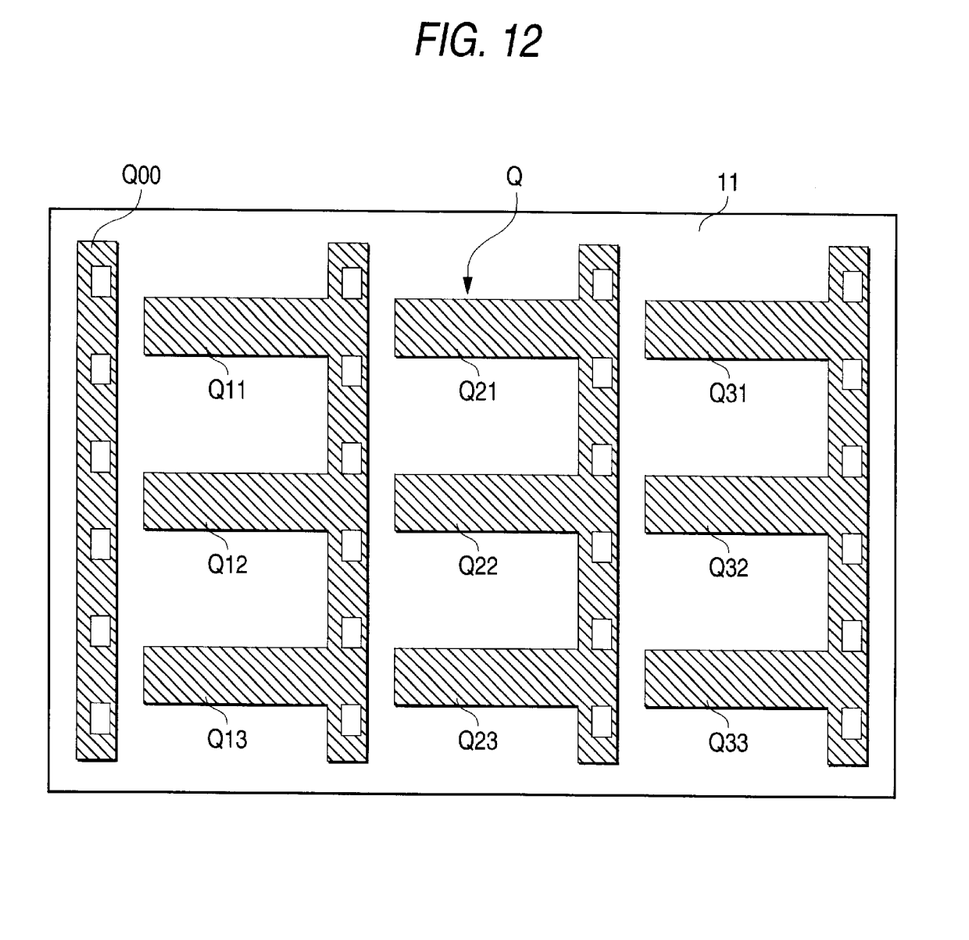
FIG. 12 is a plan view showing an intermediate product obtained by the production step in FIGS. 11(a) and 11(b).
Figure 13:
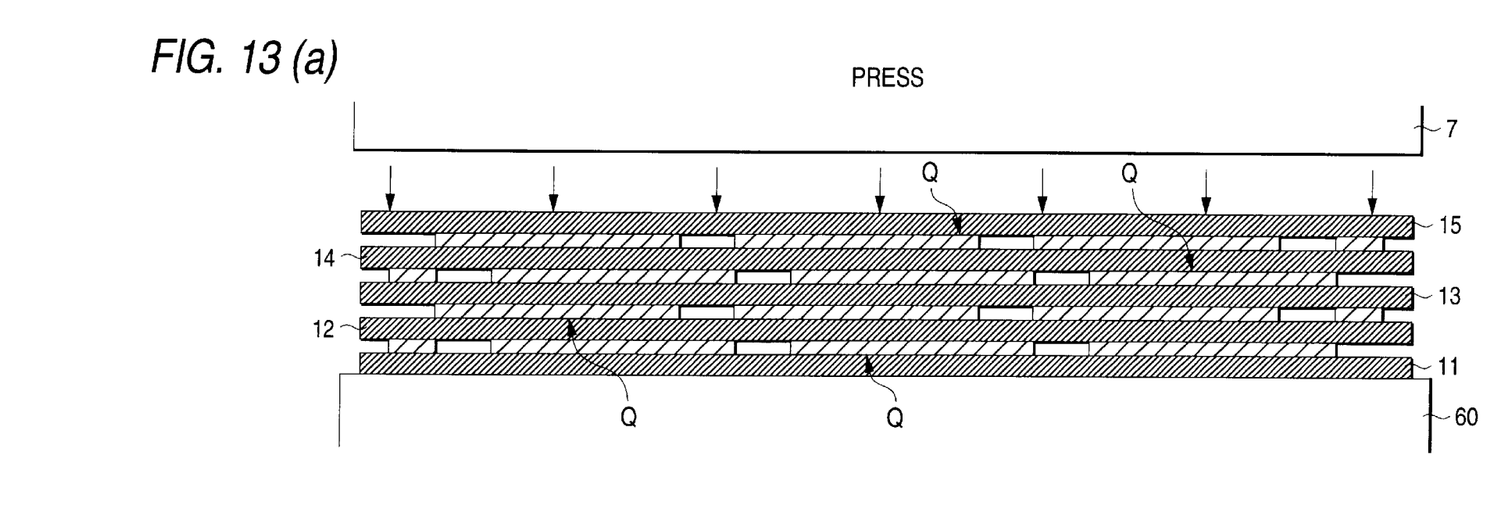
FIGS. 13(a) and 13(b) are schematic views for explaining production steps next to FIGS. 11(a) and 11(b).

Then, as shown in FIGS. 11(b) and 12, a conductor paste 20 is applied onto the semiconductor ceramic sheet 11 to thereby form an electrically conductive coating film set Q. The electrically conductive coating film set Q is constituted by a matrix of three rows and three columns of electrically conductive coating films Q11 to Q33, and an electrically conductive coating film Q00. Although the arrangement of the electrically conductive coating films Q11 to Q33 is expressed as a matrix of three rows and three columns, the number of rows and the number of columns can be changed at option. The electrically conductive coating film Q00 plays the role of a marker at the time of cutting thereafter. A screen printing method using a screen 61 and a squeegee 62 as shown in FIG. 11(a) is suitable for a method of applying the conductor paste 20. The reference numeral 60 designates a support table on which the semiconductor ceramic sheet 11 is mounted.

Figure 14:
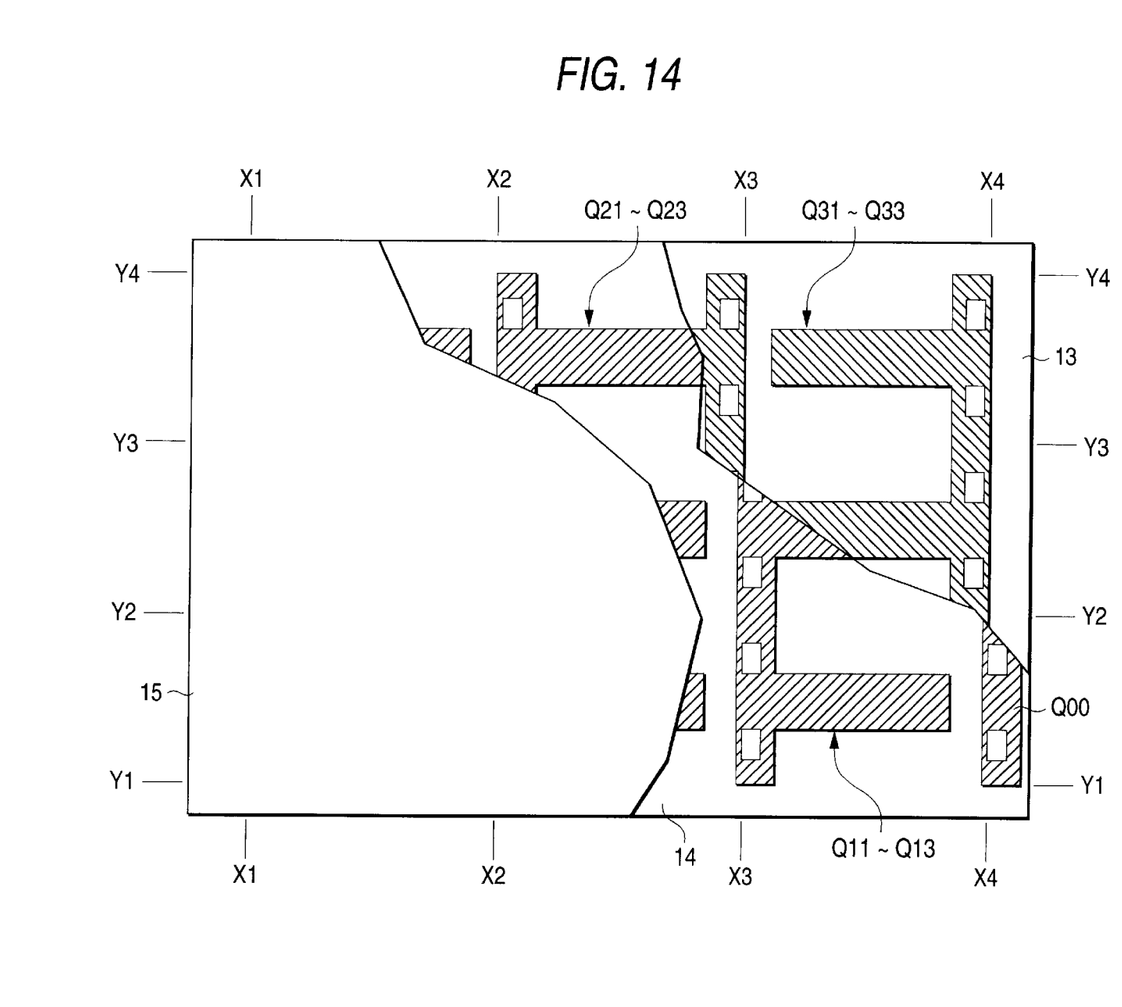
FIG. 14 is a partly cutaway sectional view showing an intermediate product obtained by the production step in FIGS. 13(a) and 13(b).
Figure 15:
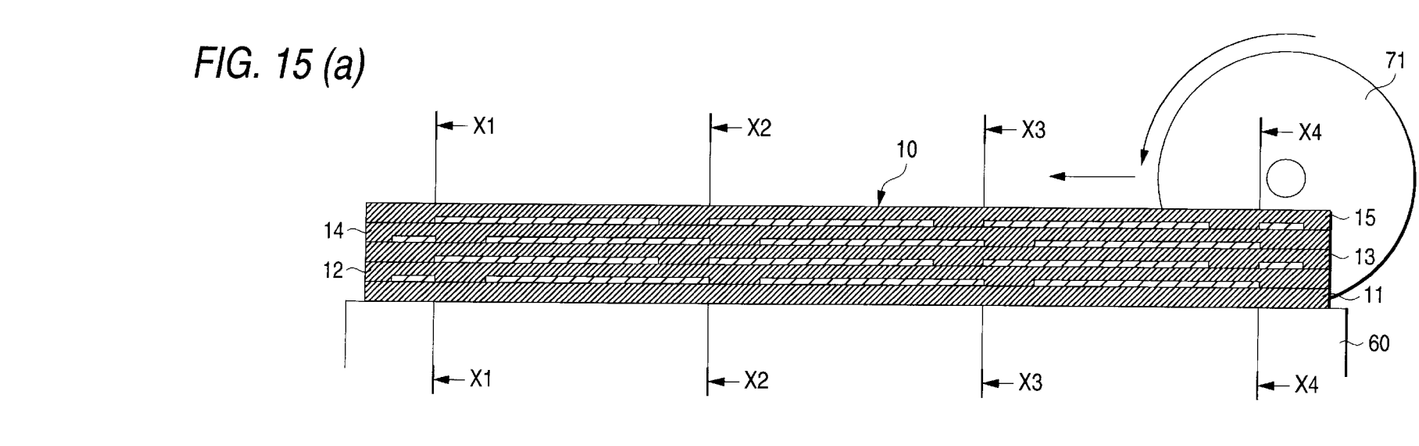
FIGS. 15(a) and 15(b) are schematic views for explaining a production step next to FIGS. 13(a) and 13(b).

Then, the semiconductor ceramic sheets 11 to 15 obtained in the aforementioned steps are piled up as shown in FIG. 13(a). Then, as shown in FIGS. 13(b) and 14, the semiconductor ceramic sheets 11 to 15 are hot-pressed to thereby obtain a green sheet 10 made from the semiconductor ceramic sheets 11 to 15. The temperature and pressure for hot-pressing are preferably in a range of from 40 to 120° C. and in a range of from about $50 \times 9.8 \times 10^4$ Pa to about $1000 \times 9.8 \times 10^4$ Pa, respectively.

Then, the green sheet 10 is divided individually in the X and Y directions (see FIG. 14) in accordance with the arrangement of the electrically conductive coating films Q11 to Q33 to thereby obtain green chips. A dicing method in which a disk-like blade 71 is rotated to perform cutting as shown in FIG. 15(a), a force-cutting method in which a V-shaped blade 72 is moved up and down to perform cutting as shown in FIG. 15(b), or the like, is known as the dividing method.

Figure 16:
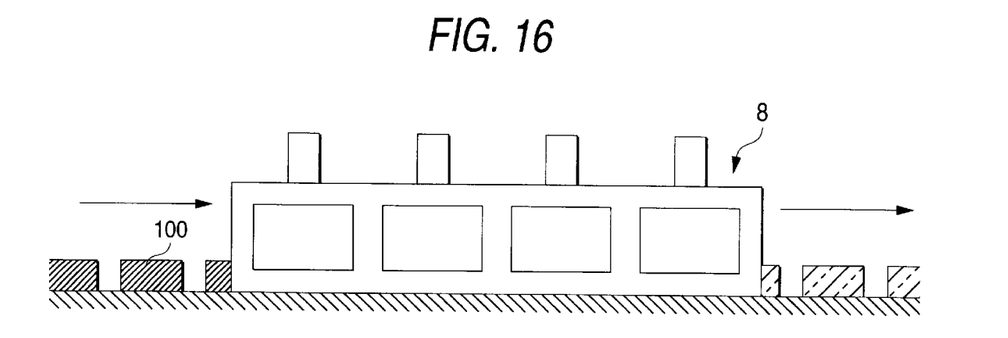
FIG. 16 is a schematic view for explaining a production step next to FIGS. 15(a) and 15(b).

The green chips 100 obtained thus are subjected to a binder removing step as shown in FIG. 16, so that a binder contained in each green chip 100 is removed by heating. The green chips 100 are further kept in the temperature condition of about 1000° C. for about 10 minutes to thereby fire the green chips 100. The reference numeral 8 designates a firing furnace.

Figure 17:
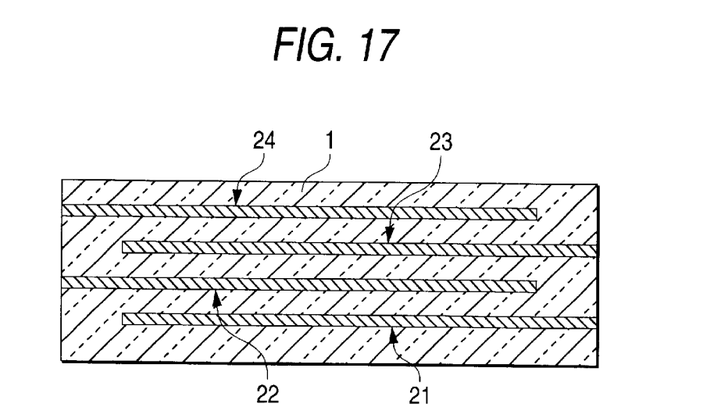
FIG. 17 is an enlarged sectional view showing an intermediate product obtained by the production step in FIG. 16.
Figure 18:
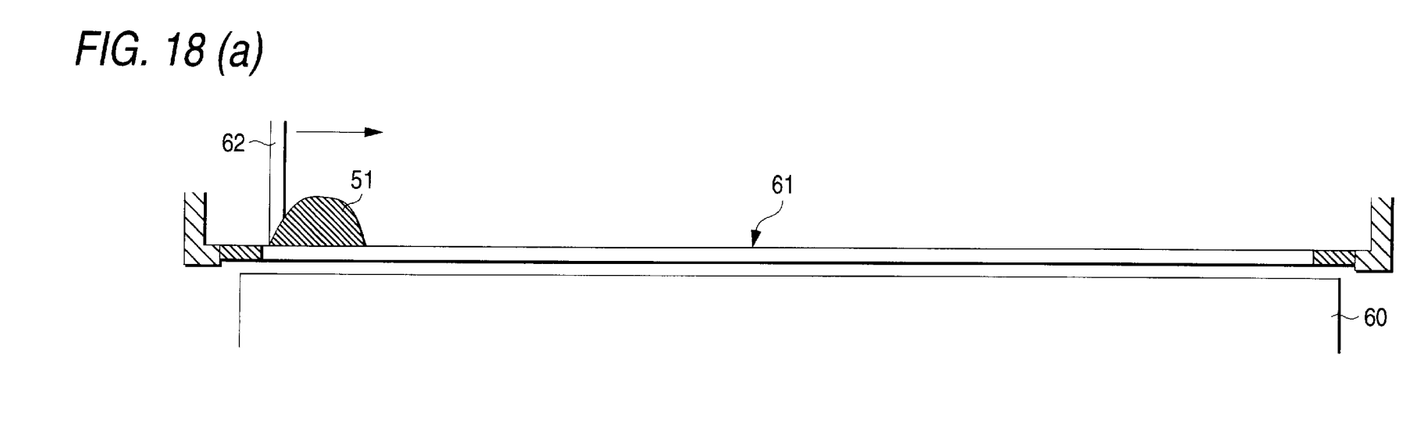
FIGS. 18(a) and 18(b) are schematic views for explaining steps for producing the semiconductor electronic part according to the present invention.
Figure 19:
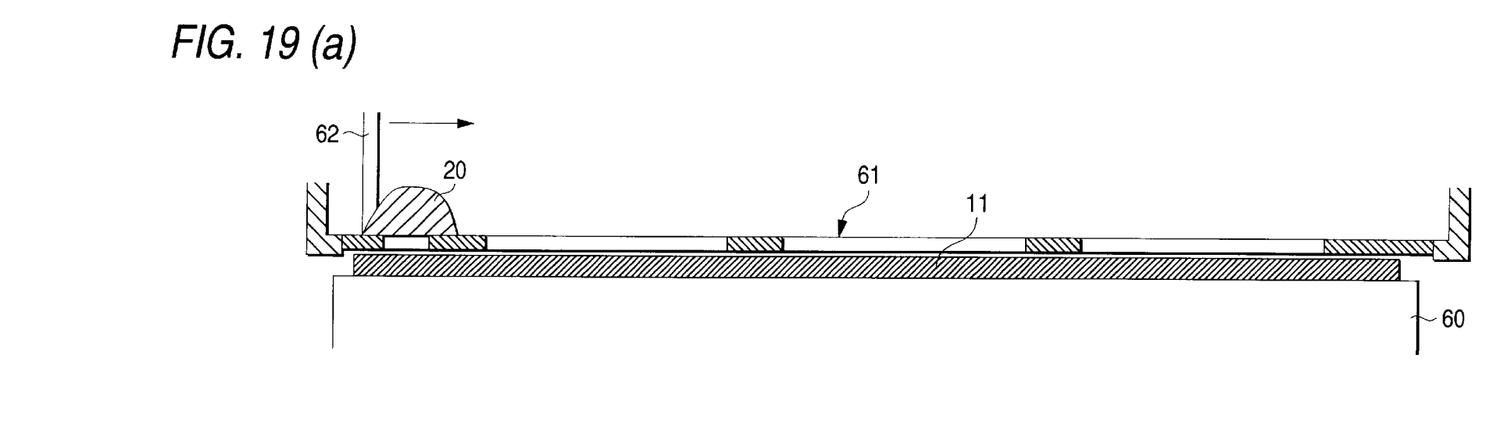
FIGS. 19(a) and 19(b) are schematic views for explaining a production step next to FIGS. 18(a) and 18(b).
Figure 20:
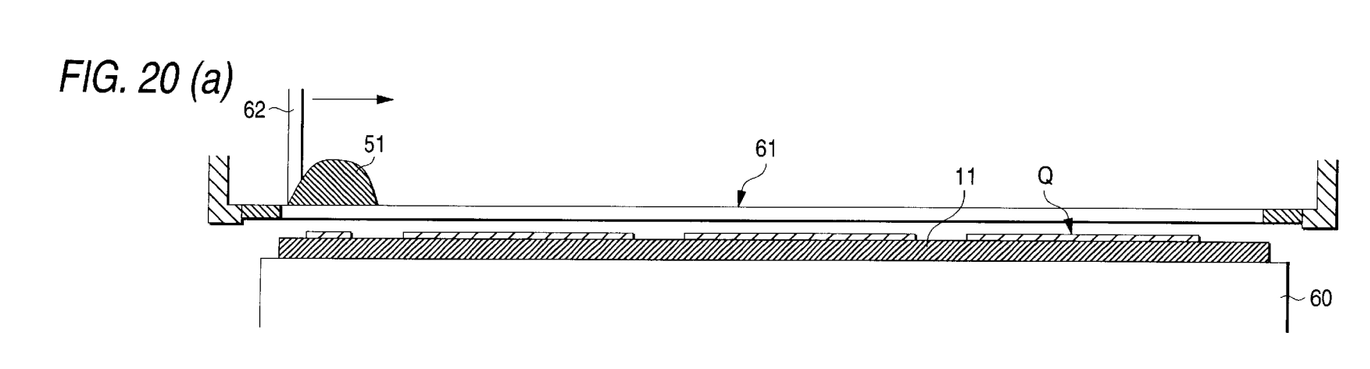
FIGS. 20(a), 20(b) and 20(c) are schematic views for explaining production steps next to FIGS. 19(a) and 19(b).

In this manner, a sintered body in which the internal electrodes 21 to 24 are provided inside the semiconductor ceramic substrate 1 so as to be distanced from one another in the thicknesswise direction is obtained as shown in FIG. 17. Then, the terminal electrodes 41 and 42 each containing silver or copper as a main component are added. Then, the terminal electrodes 41 and 42 are electroplated with Ni, Sn and solder. Thus, the semiconductor electronic part which is a final product shown in FIGS. 1 to 7 is completed.

FIGS. 18(a) to 20(c) are schematic views for explaining a printing method. In the drawings, constituent parts the same as those shown in FIGS. 10 to 17 are referenced correspondingly.

First, as shown in FIG. 18(a), application of a semiconductor ceramic paste 51 onto a support table 60 is repeated by a required number of times by use of a screen 61 and a squeegee 62. Thus, a semiconductor ceramic sheet 11 is obtained as shown in FIG. 18(b).

Then, as shown in FIG. 19(a), a conductor paste 20 is applied onto the semiconductor ceramic sheet 11 by use of the screen 61 and the squeegee 62. Thus, as shown in FIG. 19(b), an arrangement of electrically conductive coating films Q11 to Q33 and Q00 is formed on the semiconductor ceramic sheet 11.

Further, as shown in FIGS. 20(a) and 20(b), the semiconductor ceramic paste 51 and the conductor paste 20 are alternately applied by use of the screen 61 and the squeegee 62 to thereby obtain a green sheet 10 shown in FIG. 20(c).

The green sheet 10 obtained thus is subjected to the individually dividing step, the binder removing step and the firing step and then the terminal electrodes 41 and 42 are added to the green sheet, in the same manner as that in the sheet lamination method. Thus, the semiconductor electronic part which is a final product is obtained.

As described above, according to the present invention, the following effects can be obtained.

(a) There can be provided a semiconductor electronic part in which strength of adhesion of the internal electrode to a semiconductor ceramic substrate is so large that troubles such as electrode peeling, chipping, cracking, etc. can be prevented securely.

(b) There can be provided a semiconductor electronic part which is high in reliability because failure in characteristic little occurs.

What is claimed is:

1. A semiconductor electronic part comprising:
   a semiconductor ceramic substrate; and
   at least one internal electrode disposed inside said semiconductor ceramic substrate, and including an end led out to an edge of said semiconductor ceramic substrate and a plurality of cutout regions.

2. The semiconductor electronic part according to claim 1, wherein said cutout regions are arranged to be distanced from one another in a direction of width of said semiconductor ceramic substrate.

3. The semiconductor electronic part according to claim 1, wherein at least one of the cutout regions is shaped into a rectangle.

4. The semiconductor electronic part according to claim 1, wherein at least one of the cutout regions is shaped into a half circle.

5. A semiconductor electronic part comprising:
   a semiconductor ceramic substrate; and
   at least one internal electrode disposed inside said semiconductor ceramic substrate, and including an end led out to an end edge of said semiconductor ceramic substrate and at least one cutout region,
   wherein said internal electrode includes a main electrode portion and a pick-up electrode portion, and
   wherein the pick-up electrode portion is disposed on one end of the main electrode portion in a lengthwise direction thereof and the pick-up electrode portion is larger in width than the main electrode portion.

6. The semiconductor electronic part according to claim 5, wherein the cutout region is provided on the inside of an end edge of the pick-up electrode portion.

7. The semiconductor electronic part according to claim 5, wherein the cutout region is shaped into a rectangle.

8. The semiconductor electronic part according to claim 5, wherein the cutout region is shaped into a half circle.

9. A semiconductor electronic part comprising:
   a semiconductor ceramic substrate;
   at least one first internal electrode disposed inside said semiconductor ceramic substrate, and including a first end led out to a first end edge of said seimconductor ceramic substrate and a plurality of first cutout regions;
   at least one second internal electrode disposed inside said semiconductor ceramic substrate, including a second end led out to a second end edge of said semiconductor ceramic substrate, and a plurality of second cutout regions.

10. The semiconductor electronic part according to claim 9, wherein the first cutout regions and the second cutout regions are respectively arranged to be distanced from one another in a direction of width of said semiconductor ceramic substrate.

11. The semiconductor electronic part according to claim 9, wherein each of the first cutout regions and the second cutout regions is shaped into a rectangle.

12. The semiconductor electronic part according to claim 9 wherein each of the first cutout regions and the second cutout regions is shaped into a half circle.

13. A semiconductor electronic part comprising:
    a semiconductor ceramic substrate;
    at least one first internal electrode disposed inside said semiconductor ceramic substrate, and including a first end led out to a first end edge of said semiconductor ceramic substrate and at least one first cutout region;
    at least one second internal electrode disposed inside said semiconductor ceramic substrate, including a second end led out to a second end edge of said semiconductor ceramic substrate, and at least one second cutout region,
    wherein each of said first internal electrode and said second internal electrode includes a main electrode portion and a pick-up electrode portion, and
    wherein the pick-up electrode portion is disposed on one end of the main electrode portion in a lengthwise direction thereof and the pick-up electrode portion is larger in width than the main electrode portion.

14. The semiconductor electronic part according to claim 13, wherein each of the first cutout region and the second cutout region is shaped into a rectangle.

15. The semiconductor electronic part according to claim 13, wherein each of the first cutout region and the second cutout region is shaped into a half circle.

16. The semiconductor electronic part according to claim 13, wherein each of the first cutout region and the second cutout region is provided on the inside of an end edge of the pick-up electrode portion.

* * * * *